United States Patent [19]

Yoshiura

[11] Patent Number: 4,614,423

[45] Date of Patent: Sep. 30, 1986

[54] VARIABLE MAGNIFICATION COPYING APPARATUS

[75] Inventor: Shoichiro Yoshiura, Yamatokoriyama, Japan

[73] Assignee: Sharp Kabushiki Kaisha, Osaka, Japan

[21] Appl. No.: 741,852

[22] Filed: Jun. 6, 1985

[30] Foreign Application Priority Data

Jun. 11, 1984 [JP] Japan ................................ 59-121001

[51] Int. Cl.[4] ............................................ G03B 27/52

[52] U.S. Cl. .................................... 355/55; 355/14 C

[58] Field of Search .................................... 355/55-59, 355/14 R, 14 C

[56] References Cited

U.S. PATENT DOCUMENTS

| | | | |
|---|---|---|---|
| 4,505,579 | 3/1985 | Furuichi | 355/55 |
| 4,533,233 | 8/1985 | Kimura et al. | 355/56 X |
| 4,543,643 | 9/1985 | Shibazaki et al. | 355/55 X |
| 4,552,450 | 11/1985 | Tomosada et al. | 355/56 X |

*Primary Examiner*—Richard A. Wintercorn

*Attorney, Agent, or Firm*—Birch, Stewart, Kolasch & Birch

[57] ABSTRACT

An improved variable magnification copying apparatus which is provided with a function for controlling the lens position after completion of a copying operation so as to prevent occurrence of erroneous copying, with a consequent reduction of time required for the copying and simultaneous improvement of the operating efficiency.

2 Claims, 3 Drawing Figures

VARIABLE MAGNIFICATION COPYING APPARATUS

BACKGROUND OF THE INVENTION

The present invention generally relates to a copying apparatus and more particularly, to a variable magnification copying apparatus arranged to shift lens positions according to a set converted magnification, and to return the lens to an equal size magnification or life size position based on a result of comparison between the detected or inputted original document size and the previously stored original document size.

Recently, with the diversification in the functions of copying apparatuses, there have been commercialized many copying apparatuses having the magnification converting function capable of copying an original document of a predetermined size onto copy paper sheets on an enlarged or contracted scale. The copying apparatus of the above type is generally so arranged that the size of an original document to be copied is detected or inputted by a sensor provided at an original document platform or an input key disposed at an operating section, thereby to calculate the converted magnification by the above original document size and the set copy paper sheet size, or to input the converted magnification by "zoom" keys provided at the operating section, and thus, by shifting the lens to the position corresponding to the converted magnification set in the manner as described above, copying at the magnification converted as desired may be effected. Accordingly, when the copying at the converted magnification is completed, it becomes necessary to keep the lens returned at a position of an equal or life size magnification at 1:1 which is normally utilized most frequently for copying.

However, the prior art variable magnification copying apparatuses as referred to above have been provided with no functions to control the lens positions after completion of the copying operation. Therefore, there has been such a disadvantage that, for example, in the case where an original document of B5 size is first copied on an enlarged scale, onto a copy paper sheet of A4 size and thereafter, a next operator is to effect copying of another original document of A4 size at an equal size or life size magnification, if the previous operator did not return the lens to the position for the equal size magnification after completion of the copying at the converted magnification, and the present operator starts the copying operation without ensuring the converted magnification, copying at erroneous size takes place, thus resulting in prolongation of time required for the copying, with a consequent rise in the running cost of the copying apparatus, and a reduction of the operating efficiency.

SUMMARY OF THE INVENTION

Accordingly, an essential object of the present invention is to provide an improved variable magnification copying apparatus which is provided with a function for controlling the lens position after completion of a copying operation, thereby to prevent occurrence of erroneous copying, with a consequent reduction of time required for the copying and simultaneous improvement of the operating efficiency.

Another important object of the present invention is to provide a variable magnification copying apparatus of the above described type which is simple in construction and stable in functioning, and can be readily manufactured at low cost.

In accomplishing these and other objects, according to one preferred embodiment of the present invention, there is provided a variable magnification copying apparatus having a function for detecting or inputting original document sizes so as to effect copying at converted magnifications by shifting lens positions according to the set copying magnifications, and characterized in that there are provided a memory means for storing the detected or inputted original document size, an original document size comparing means for comparing the original document size previously stored with the original document size to be copied at present, a lens position returning means for returning the lens to a position corresponding to an equal size magnification copying in the case where there is a difference between the original document size previously stored and the original document size to be copied at present upon the comparison, and means for maintaining the previous copying magnification by releasing functions of said original document size comparing means and said lens position returning means.

By the arangement according to the present invention as described above, erroneous copying which may take place during copying operations in the variable magnification copying apparatus can be prevented, and thus, there are available such advantages that the time required for the copying operations is reduced, and the operating efficiency of the copying apparatus is simultaneously improved, and also, that the cost increase is small, since functions already provided may be employed as input devices.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
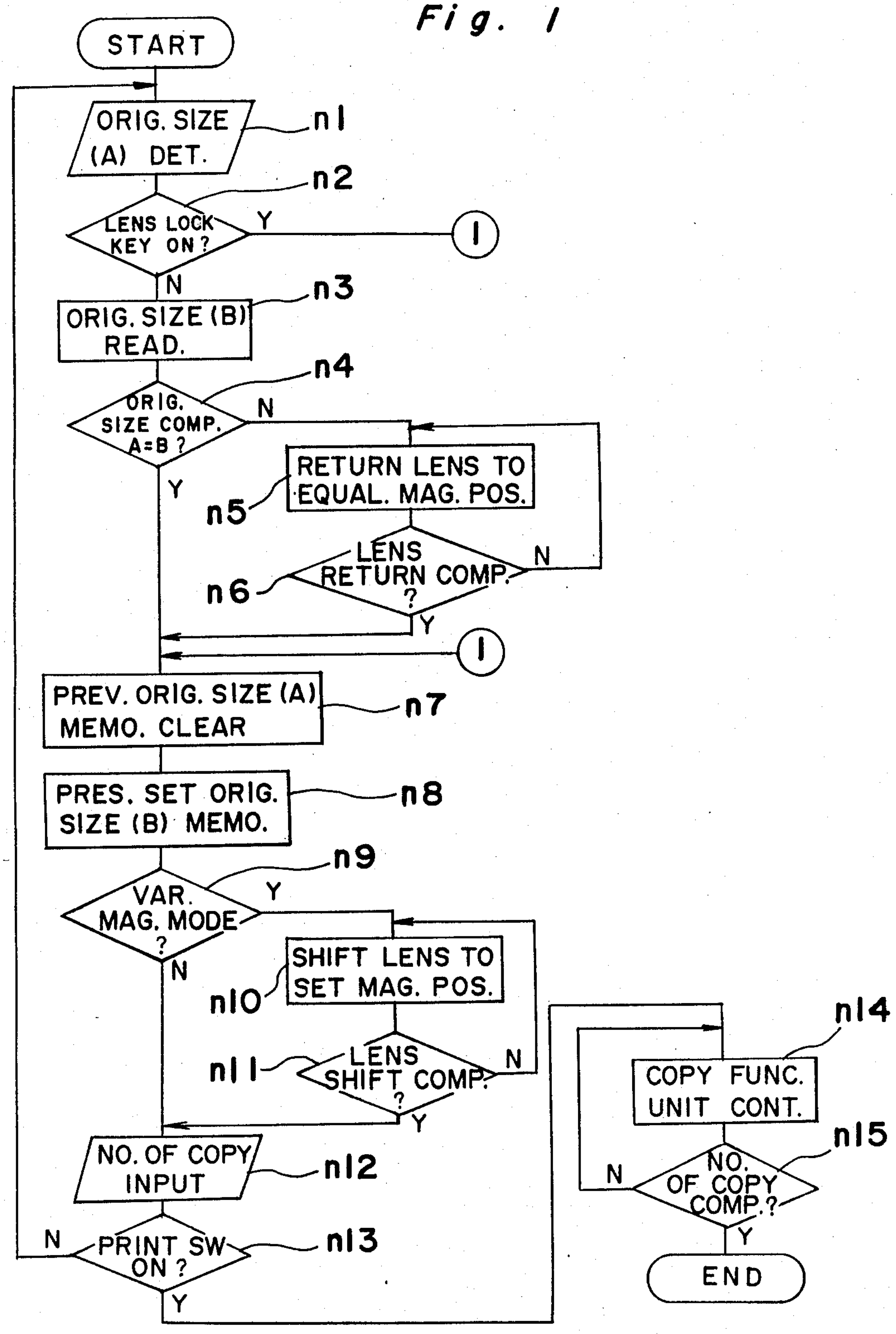
FIG. 1 is a flow-chart for explaining functions of a variable magnification copying apparatus according to one preferred embodiment of the present invention.

Before the description of the present invention proceeds, it is to be noted that like parts are designated by like reference numerals throughout the accompanying drawings.

Figure 2:
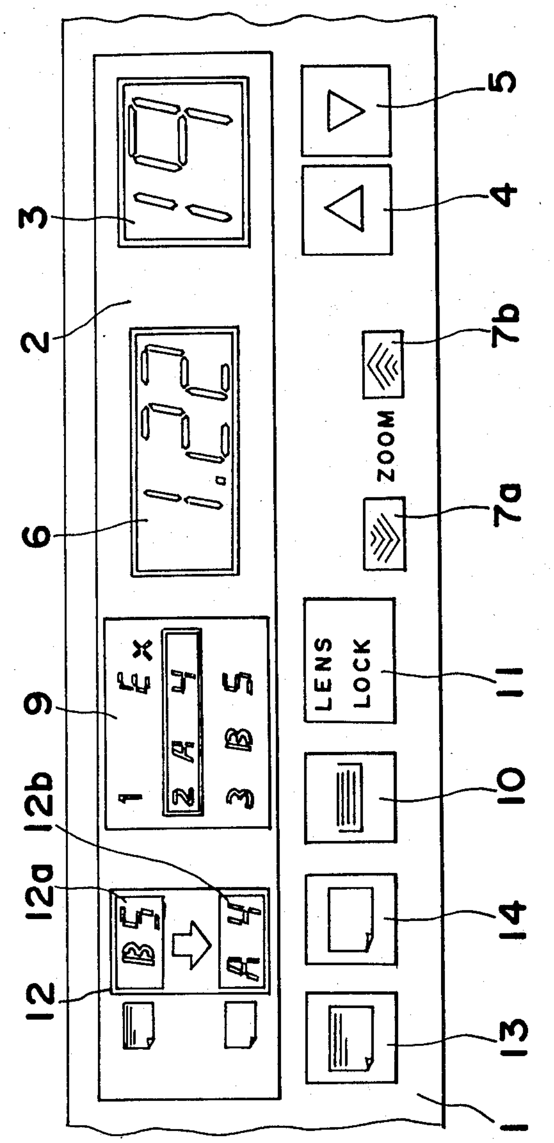
FIG. 2 is a fragmentary front elevational view of an operating section for the copying apparatus of FIG. 1.

Referring now to the drawings, there is shown in FIG. 2, the main portion of an operating section or control panel 1 of a variable magnification copying apparatus according to one preferred embodiment of the present invention.

In FIG. 2, the operating section 1 includes a display portion 2 for display of set numerical values, etc. having a set number of copy display unit 3 at its right end. By operating a count-up key 4 provided under the display unit 3, the numerical values may be increased while, by actuating a count-down key 5 provided adjacent to the count-up key 4, the numerical values can be decreased.

The numerical values displayed in this display unit 3 are reduced at each completion of the copying operation so as to repeat the copying function until "0" is displayed thereon. At the left side of the display unit 3, there is provided a converted magnification display unit 6 for displaying the converted magnifications input by zoom keys 7*a* and 7*b* provided thereunder or calculated in a manner to be described later. At the left side end of the display portion 2, a converted size display unit 12 is provided, and the detected original document size is displayed at the upper portion 12*a* of the display unit 12 through actuation of an original document size detecting key 13. The copy paper sheet size displayed at the lower portion 12*b* of the converted size display unit 12 is changed each time a copy paper sheet setting key 14 is operated. Meanwhile, the converted magnification calculated from the original document size and the copy paper sheet size set by the operation of the original document size detecting key 13 and the copy paper sheet size setting key 14 and displayed on the converted size display unit 12, is indicated on the converted magnification display unit 6. Moreover, at the right side of the converted size display unit 12, there is provided a copy paper sheet cassette display unit 9, and a tray in which a copy paper sheet cassette of the size determined by the operation of the copy paper sheet setting key 14 is set, is selected from paper feeding trays disposed in three stages in a paper feeding section of the copying apparatus, by a copy paper sheet cassette selecting key 10 provided under the display unit 9, and thus, the unit 9 displays the selected tray and the size of the copy paper sheet placed on the tray for the operator to ensure. By operating a lens lock key 11 disposed at the right side of the copy paper sheet cassette selecting key 10, the lens may be fixed in the position, and thus, it is possible to copy a plurality of kinds of original documents in different sizes at the same converted magnification.

Figure 3:
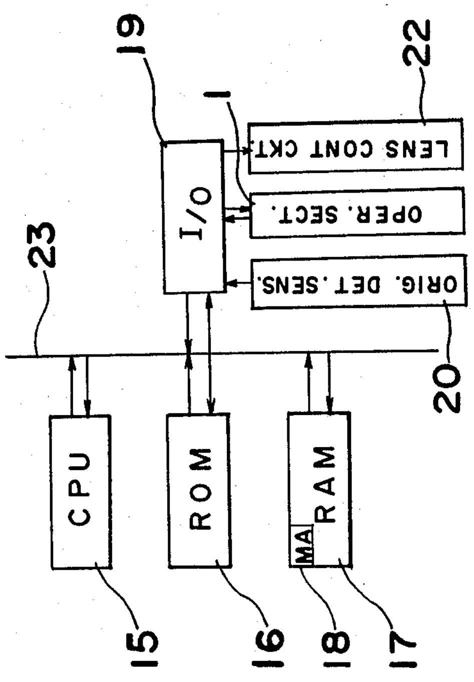
FIG. 3 is a schematic block diagram explanatory of a general construction of the copying apparatus of FIG. 1.

Reference is also made to FIG. 3 showing a block diagram of the variable magnification copying apparatus according to the present invention.

In FIG. 3, a ROM (read only memory) 16 for regulating functioning of a CPU (central processing unit) 15, an I/O (input/output) interface 19, and a RAM (random access memory) 17 for storing data from the I/O interface 19, are connected to the CPU 15 through an internal bus 23. At a portion MA of the RAM 17, there is provided an original document size memory area 18 for storing the detected original document size. Meanwhile, an original document size detecting sensor 20 provided at the lower part of an original document platform (not shown), the operating section 1 as referred to earlier, and a lens control circuit 22 are connected to the I/O interface 19.

Referring further to FIG. 1, there is shown a flowchart for explaining functionings of the variable magnification copying apparatus according to the present invention.

In FIG. 1, after an original document has been set on the original document platform of the copying apparatus, an original document size (A) is detected at step n1 through operation of the original document size detecting key 13. At step n2, it is judged whether or not the lens lock key 11 is actuated, and if it is not actuated, an original document size (B) stored previously is read out from the original document size memory area MA 18 of the RAM 17 at step n3. At step n4, the original document sizes (A) and (B) are compared, and in the case where they are different from each other, the lens is returned to a position corresponding to the equal size or life size magnification at steps n5 and n6, and the procedure proceeds to step n7. In the case where the lens lock key 11 is operated at step n2 or the original document sizes (A) and (B) are equal to each other at step n4, the procedure directly proceeds to step n7 to erase the stored original document size (A), and the original document size (B) set at present is stored at step n8. At step n9, it is judged whether or not the zoom key 7*a* or 7*b* is operated, or the magnification converting mode is one in which the set copy paper sheet size is different from the original document size, and if it is found to be in the magnification converting mode, the lens is displaced to the position corresponding to the converting magnification at steps n10 and n11, and the procedure proceeds to step n12. If it is judged to be in the equal magnification mode at step n9, the procedure directly proceeds to step n12 to input the number of copies to be taken, and upon operation of the print switch at step n13, copying for the set number of sheets is effected at steps n14 and n15.

In the functionings of the copying apparatus as described so far, step n4 corresponds to the original document size comparing means, steps n5 and n6, to the lens position returning means, and step n2, to the means for maintaining the copying magnification according to the present invention.

As is clear from the foregoing description, according to the arrangement of the present invention as explained so far, erroneous copying in the variable magnification copying apparatus may be advantageously prevented, while there are provided such advantages that the time required for the copying operations is reduced, and the operating efficiency of the copying apparatus is also improved, with a consequent reduction in cost.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A variable magnification copying apparatus having a function for detecting or inputting original document sizes so as to effect copying at converted magnifications by shifting lens positions according to the set copying magnifications, the improvement comprising a memory means for storing the detected or inputted original document size, an original document size comparing means for comparing the original document size previously stored with the original document size to be copied at present, a lens position returning means for returning the lens to a position corresponding to an equal size magnification copying in the case where there is a difference between the original document size previously stored and the original document size to be copied at present upon the comparison, and means for maintaining the previous copying magnification by releasing functions of said original document size comparing means and said lens position returning means.

2. A variable magnification copying apparatus as claimed in claim 1, wherein said memory means is an original document size memory area MA provided at a portion of a random access memory RAM of a microcomputer.

* * * * *